United States Patent
Libenzi

(10) Patent No.: US 6,745,192 B1
(45) Date of Patent: Jun. 1, 2004

(54) SYSTEM AND METHOD FOR PROVIDING A MULTI-TIERED HIERARCHICAL TRANSIENT MESSAGE STORE ACCESSED USING MULTIPLY HASHED UNIQUE FILENAMES

(75) Inventor: Davide Libenzi, Hillsboro, OR (US)

(73) Assignee: Networks Associates Technology Inc., Santa Clara, CA (US)

( * ) Notice: Subject to any disclaimer, the term of this patent is extended or adjusted under 35 U.S.C. 154(b) by 296 days.

(21) Appl. No.: 10/016,501

(22) Filed: Dec. 10, 2001

Related U.S. Application Data

(60) Provisional application No. 60/309,835, filed on Aug. 3, 2001, and provisional application No. 60/309,858, filed on Aug. 31, 2001.

(51) Int. Cl.[7] .......................... G06F 7/00; G06F 17/00; G06F 17/30; G06F 15/16
(52) U.S. Cl. .............. 707/100; 707/1; 707/3; 709/206
(58) Field of Search ............... 707/1, 3, 100; 709/206

(56) References Cited

U.S. PATENT DOCUMENTS

| | | | | |
|---|---|---|---|---|
| 5,724,512 A | * | 3/1998 | Winterbottom | 709/226 |
| 6,009,462 A | * | 12/1999 | Birrell et al. | 709/206 |
| 6,216,265 B1 | * | 4/2001 | Roop et al. | 725/54 |
| 6,226,666 B1 | * | 5/2001 | Chang et al. | 709/202 |
| 2001/0034839 A1 | * | 10/2001 | Karjoth et al. | 713/190 |
| 2002/0112008 A1 | * | 8/2002 | Christenson et al. | 709/206 |

OTHER PUBLICATIONS

"Virus Information Library," http://vi.mcafee.com: Networks Associates, Inc., 2001.
Stephens W R, "SMTP: Simple Mail Transfer Protocol," *TCP/IP Illustrated: The Protocols*; Vol 1, Ch. 28, pp. 441–459, 1999, Addison–Wesley, USA.

* cited by examiner

*Primary Examiner*—Wayne Amsbury
*Assistant Examiner*—Cindy Nguyen
(74) *Attorney, Agent, or Firm*—Patrick J. S. Inouye; Christopher J. Hamaty

(57) ABSTRACT

A system and method for providing a multi-tiered hierarchical transient message store accessed using multiply hashed unique filenames is described. A hierarchical message store is maintained. The hierarchical message store is logically structured with a plurality of storage nodes. Each storage node is dependently linked to one of a plurality of index nodes. Each index node is dependently linked to a root node. An incoming message is intercepted at a network domain boundary and assigning a unique filename. An index hash of the unique filename, corresponding to one such index node, and a storage hash of the unique filename, corresponding to one such storage node, are generated. The message is stored in the hierarchical message store at the one such index node and the one such storage node.

15 Claims, 7 Drawing Sheets

SYSTEM AND METHOD FOR PROVIDING A MULTI-TIERED HIERARCHICAL TRANSIENT MESSAGE STORE ACCESSED USING MULTIPLY HASHED UNIQUE FILENAMES

CROSS-REFERENCE TO RELATED APPLICATIONS

This patent application is a conversion of U.S. provisional patent applications, Ser. No. 60/309,835, filed Aug. 3, 2001, pending; and Ser. No. 60/309,858, filed Aug. 3, 2001, pending; the priority dates of which are claimed and the disclosures of which are incorporated by reference.

FIELD OF THE INVENTION

The present invention relates in general to storage of transient message packets and, in particular, to a system and method for providing a multi-tiered hierarchical transient message store accessed using multiply hashed unique filenames.

BACKGROUND OF THE INVENTION

Computer viruses, or simply "viruses," are executable programs or procedures, often masquerading as legitimate files, messages or attachments that cause malicious and sometimes destructive results. More precisely, computer viruses include any form of self-replicating computer code which can be stored, disseminated, and directly or indirectly executed by unsuspecting clients. Viruses travel between machines over network connections or via infected media and can be executable code disguised as application programs, functions, macros, electronic mail (email) attachments, images, applets, and even hypertext links.

The earliest computer viruses infected boot sectors and files. Over time, computer viruses became increasingly sophisticated and diversified into various genre, including cavity, cluster, companion, direct action, encrypting, multipartite, mutating, polymorphic, overwriting, self-garbling, and stealth viruses, such as described in "Virus Information Library," http://vil.mcafee.com/default.asp?, Networks Associates Technology, Inc., (2001), the disclosure of which is incorporated by reference. Macro viruses are presently the most popular form of virus. These viruses are written as scripts in macro programming languages, which are often included with email as innocuous-looking attachments.

The problems presented by computer viruses, malware, and other forms of bad content are multiplied within a bounded network domain interfacing to external internetworks through a limited-bandwidth service portal, such as a gateway, bridge or similar routing device. The routing device logically forms a protected enclave within which clients and servers exchange data, including email and other content. All data originating from or being sent to systems outside the network domain must pass through the routing device. Maintaining high throughput at the routing device is paramount to optimal network performance.

Routing devices provide an efficient solution to interfacing an intranetwork of clients and servers to external internetworks. Most routing devices operate as store-and-forward packet routing devices, which can process a high volume of traffic transmitting across the network domain boundary. These devices can be coupled to specialized antivirus systems that intercept transient messages at the network domain boundary to guard against the introduction of messages containing viruses, malware and other forms of bad content.

To ensure minimal effect on packet throughput, antivirus systems typically stage the intercepted messages in an intermediate store or queue pending processing by the antivirus system. The intermediate store, however, can cause delays in packet throughput and can potentially degrade network performance by creating a bottleneck at the network boundary due to processing delays.

One particular form of antivirus system combines packet screening and content scanning using functionally separate modules respectively to screen the contents of message header fields and to scan the contents of each message body and any attachments, including embedded attachments. Screened messages are staged in an intermediate message queue pending scanning. As the screener processes transient messages at a higher rate than the antivirus scanner, the message queue can potentially become saturated with screened messages and cause delay in packet delivery.

In addition, the actual messages staged in the intermediate message store are physically stored as individual files using the file system supported by the host upon which the antivirus system operates. File naming conventions and directory structures and capacities, though, are system-dependent and can vary greatly between different operating system platforms. Accordingly, each antivirus system must be customized to operate within the confines of each specific file system. As well, limitations in file names and directory capacity can rapidly be exceeded in a high packet throughput environment.

Therefore, there is a need for an approach to providing a portable intermediate storage structure for staging transient message packets intercepted at a network domain boundary. Preferably, such an approach would allow rapid message storage and retrieval using a unique file naming scheme.

There is a further need for an approach to supporting an extensible message queuing structure. Preferably, such an approach would allow dynamic and flexible capacity resizing.

SUMMARY OF THE INVENTION

The present invention provides a system and method for efficiently staging transient message packets in a portable intermediate message store. Incoming message packets are intercepted and screened for readily-discoverable characteristics indicative of an infected message. A unique filename is generated for each screened message and a pair of index node and storage node identifiers are calculated from the unique filename. The identifiers are stored in a unique filename table associated with the message. The message is physically stored in a hierarchical message store using the index node and storage node identifiers for subsequent retrieval and scanning.

An embodiment of the present invention provides a system and method for providing a multi-tiered hierarchical transient message store accessed using multiply hashed unique filenames. A hierarchical message store is maintained. The hierarchical message store is logically structured with a plurality of storage nodes. Each storage node is dependently linked to one of a plurality of index nodes. Each index node is dependently linked to a root node. An incoming message is intercepted at a network domain boundary and assigning a unique filename. An index hash of the unique filename, corresponding to one such index node, and a storage hash of the unique filename, corresponding to one such storage node, are generated. The message is stored in the hierarchical message store at the one such index node and the one such storage node.

A further embodiment provides a system and a method for providing a multi-tiered hierarchical transient message store accessed using multiply hashed unique filenames. A unique filename identifying an incoming message packet intercepted entering a bounded network domain is generated. An index checksum is calculated from the unique filename using a seed value associated with an index level in a hierarchical message store. A storage checksum is calculated from the unique filename using a seed value associated with a storage level in the hierarchical message store. The incoming message packet is stored in an index node in the index level and a storage node in the storage level and dependent on the index node. The index node and storage node are respectively indexed by the index checksum and the storage checksum.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
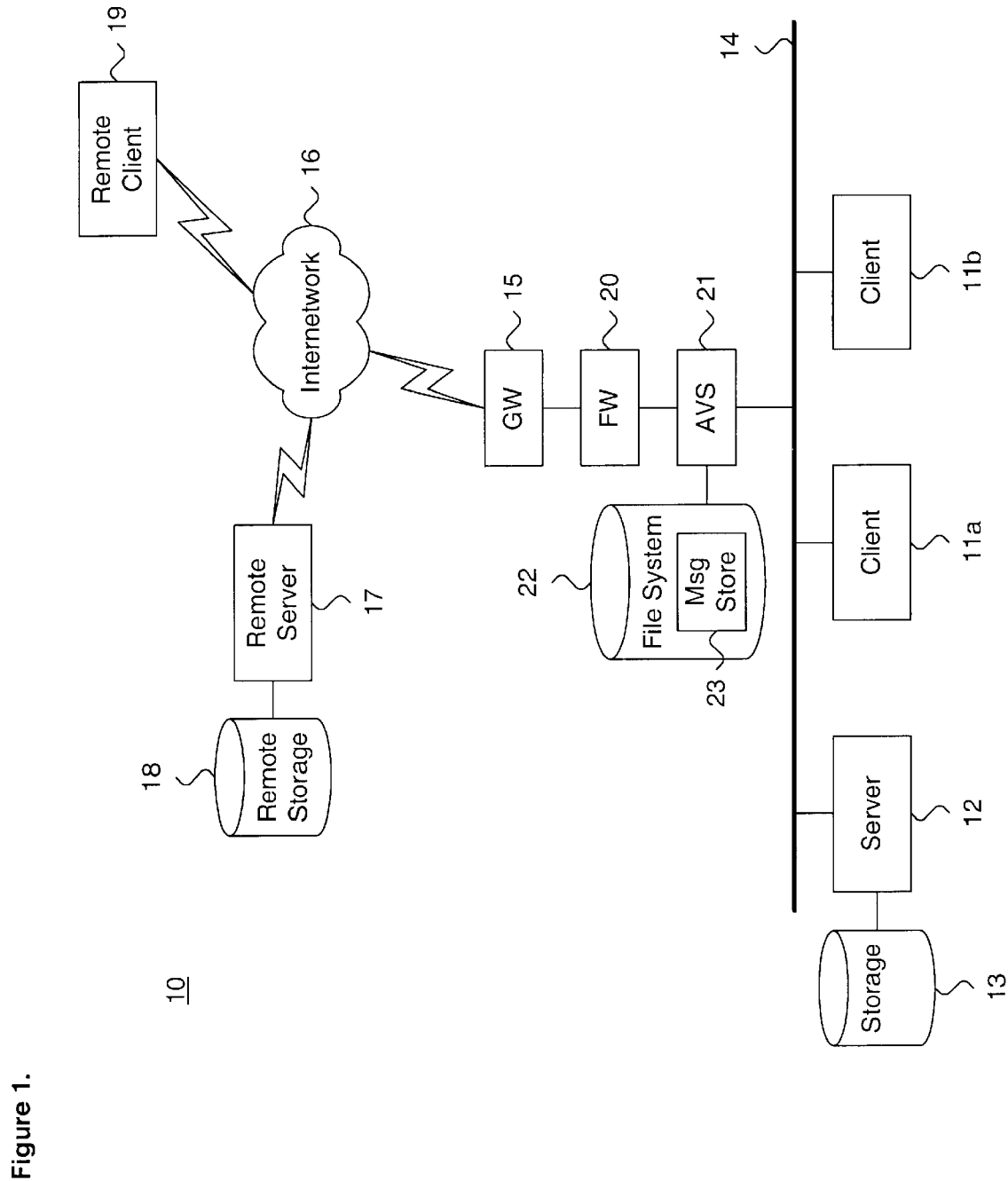
FIG. 1 is a block diagram showing a system for providing a multitiered hierarchical transient message store accessed using multiply hashed unique filenames, in accordance with the present invention.

FIG. 1 is a block diagram showing a system for storing transient message packets in a hierarchical message store 23 for use in a distributed computing environment 10, in accordance with the present invention. By way of example, a gateway 15 (or bridge, router, or similar packet routing device) interfaces an intranetwork 14 to an internetwork 16, including the Internet. The intranetwork 14 interconnects one or more servers 12 with one or more clients 11a–b within a bounded network domain defined by a common network address space. The server 12 includes a storage device 13 for common file storage and sharing. The clients 11a–b can also include storage devices (not shown).

The individual servers 12 and clients 11a–b externally connect to one or more remote servers 17 and remote clients 19 over the internetwork 16 via the gateway 15. The gateway 15 operates as a store-and-forward packet routing device, which processes a high volume of packet traffic transmitting across the network domain boundary. The gateway 15 provides an efficient solution to interfacing the individual servers 12 and clients 11a–b to external systems operating over the internetwork 16. Optionally, a firewall 20 can provide limited security to the intranetwork 14 by providing filtering of packets originating from unauthorized users. Other network topologies and configurations are feasible, as would be recognized by one skilled in the art.

In addition to the firewall 20, an antivirus system (AVS) 21 actively analyzes message packets incoming to the bounded network domain for the presence of computer viruses and provides dynamic screening and scanning of transient messages. The screened messages are efficiently staged in the hierarchical message store 23 prior to scanning. The hierarchical message store 23 is physically stored within a conventional file system 22 and implements a portable message referencing scheme, as further described below with reference to FIG. 3. Each component in the distributed computing environment 10 executes a layered network protocol stack for processing different types of packets, including electronic mail (email) exchanged in accordance with the Simple Mail Transport Protocol (SMTP). In the described embodiment, the system and method are implemented in the Web Shield E500 ASAP active security antivirus product, Version 1.0, licensed by Network Associates, Inc., Santa Clara, Calif.

The individual computer systems, including servers 12, 17 and clients 11a–b, 19 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
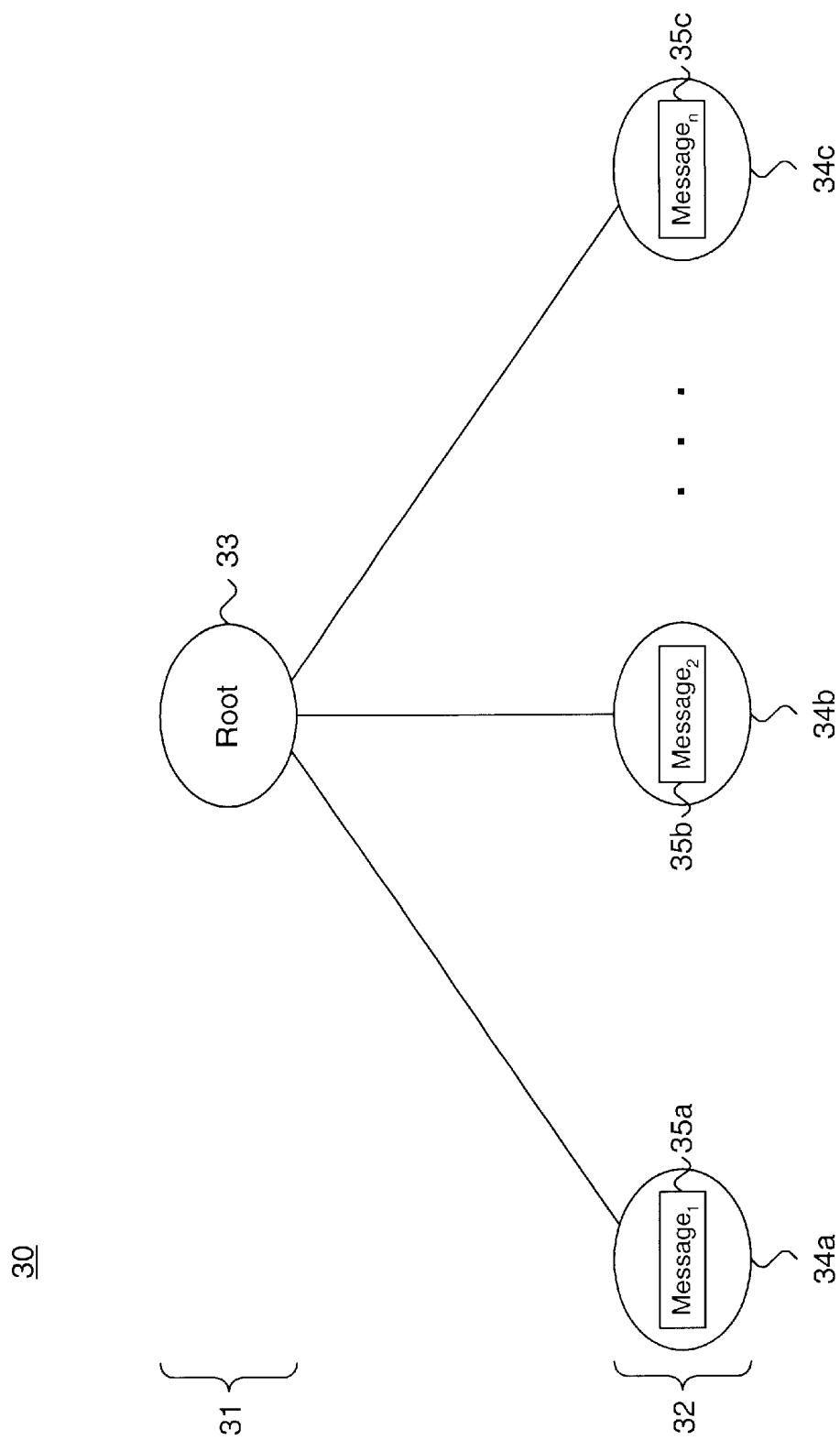
FIG. 2 is a tree diagram showing a prior art hierarchical message store for staging transient message packets.

FIG. 2 is a tree diagram showing a prior art hierarchical message store 30 for staging transient message packets. The message store 30 stores transient messages 35a–c in two layers: root layer 31 and leaf layer 32. The root layer 31 includes a single root node 33, which anchors the message store 30. The leaf layer 32 includes a multiplicity of leaf nodes 34a–c, each storing a message 35a–c. The individual leaf nodes 34a–c are numbered sequentially using a rotating counter that is reset back to zero when a predefined upper limit is reached.

Operationally messages 35a–c are maintained in the message store 30 using a flat filing scheme. To store a message 35a–c, a new leaf node 34a–c is added to the root node 33, using the next number in the sequence of leaf nodes. To access a message 35a–c, the contents of the leaf node 34a–c storing the message 35a–c are retrieved by performing a lookup of the sequence number of the leaf node.

Although storage and access of messages 35a–c in the prior art message store 30 are straightforward in operation, the flat filing scheme is limiting in capacity and the file naming conventions used to label the root node 33 and leaf nodes 34a–c are system-dependent. The maximum number of leaf nodes 34a–c associated with a given root node 33 is set by the file system supported by the underlying platform upon which the message store 30 is provided. As well, the use of a rotating counter prevents the capacity of the message store 30 from being increased dynamically. Rather, the message store 30 must be rebuilt each time the capacity is increased.

Figure 3:
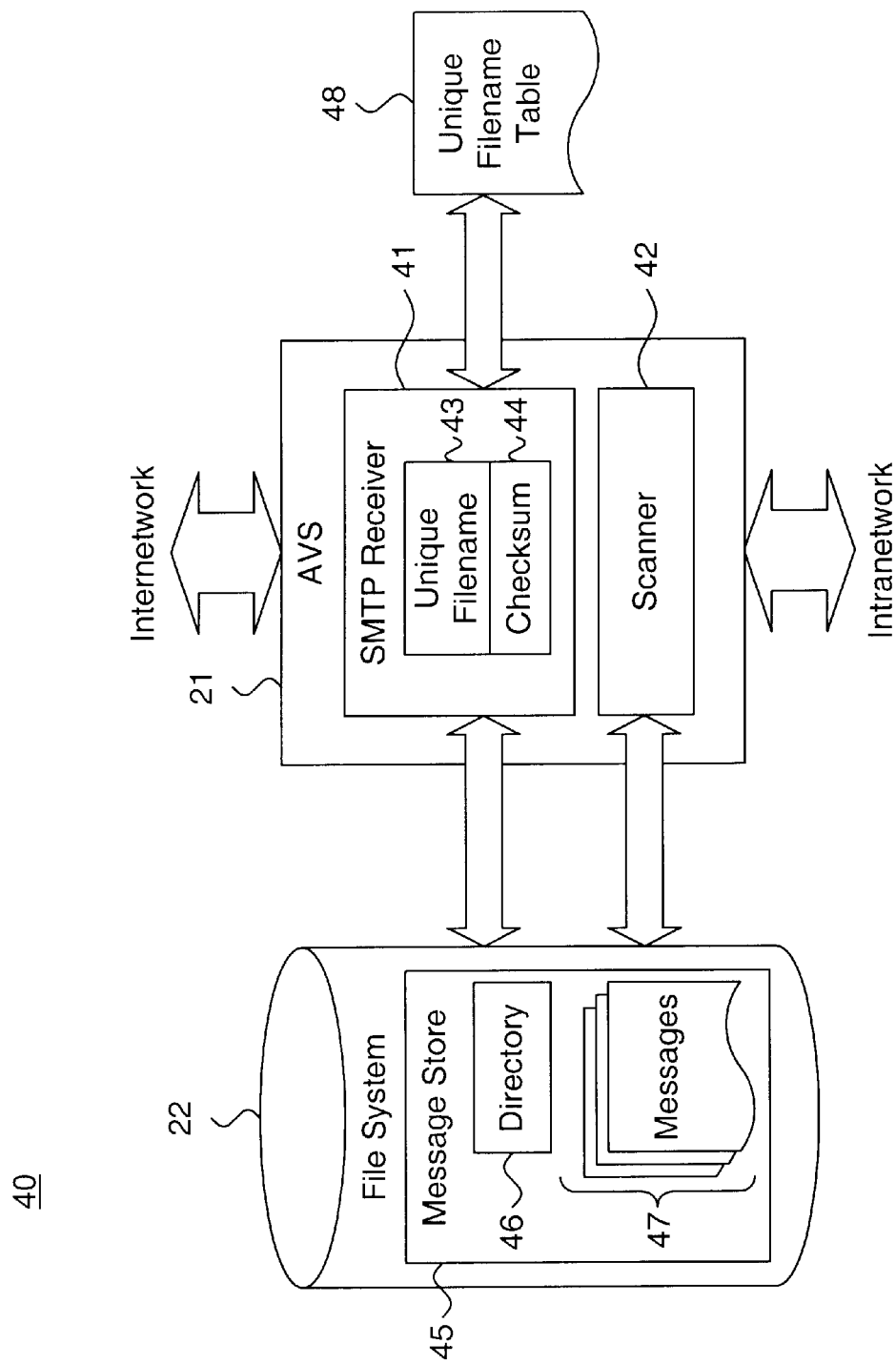
FIG. 3 is a functional block diagram showing the software modules of the antivirus system of FIG. 1.

FIG. 3 is a functional block diagram showing the software modules 40 of the antivirus system 21 of FIG. 1. The antivirus system 21 includes two functionally separate modules: SMTP receiver 41 and antivirus scanner 42. The SMTP receiver 41 intercepts and screens transient message packets, preferably exchanged in compliance with the SMTP protocol, such as described in W. R. Stevens, "TCP/IP Illustrated, Vol. 1, The Protocols," Ch. 28, Addison Wesley Longman, Inc. (1994), the disclosure of which is incorporated by reference. The fields in each message packet header are screened for indications that the accompanying contents of the message contain a virus, malware or other form of bad content, such as described in commonly-assigned related U.S. patent application Ser. No. 10/016,509, entitled "System And Method For Providing Dynamic Screening Of Transient Messages In A Distributed Computing Environment," filed Dec. 10, 2001, pending, the disclosure of which is incorporated by reference. For example, a subject field in a header containing the string "Check this out" would signal an infected message when intercepted by the SMTP receiver 31 along with other similar messages confirmed to be infected. Only screened "clean" messages 35 are forwarded on the antivirus scanner 42.

The SMTP receiver 41 and antivirus scanner 42 are functionally separate modules. The SMTP receiver 41 operates on the contents of message header fields. The antivirus scanner 42 operates on the actual contents of the message body and any attachments, including embedded attachments. The antivirus scanner 42 includes a retrieval module (not shown), which retrieves each screened message from a message store (queue) 45 for scanning using standard antivirus techniques, as are known in the art. As well, in a further embodiment, the antivirus scanner 42 works closely in conjunction with the SMTP receiver 41, which stores an infection marker, in the form of a checksum, associated with specific message content identified as containing a virus, malware or other form of bad content, such as described in commonly-assigned related U.S. patent application Ser. No. 10/016,533, entitled "System And Method For Performing Efficient Computer Virus Scanning Of Transient Messages Using Checksums In A Distributed Computing Environment," filed Dec. 10, 2001, pending, the disclosure of which is incorporated by reference.

The antivirus scanner 42 operates in an event-based manner by processing screened messages fed into the message store 45 by the SMTP receiver 41. The message store 45 functions as an event-handler by creating a logical connection between the SMTP receiver 41 and antivirus scanner 42. The message store 45 is implemented within a conventional file system 22 using a portable message referencing scheme. As further described below with reference to FIG. 4, the message store 21 includes three hierarchical levels to provide rapid storage and retrieval of messages and dynamic capacity resizing.

The SMTP receiver 41 includes two modules for storing screened messages 47 in the message store 23: unique filename 43 and checksum 44. As each message is screened, the unique filename module 43 generates a unique filename for the message 47. In the described embodiment, each unique filename has the format mstime.pid.hostname, where mstime is the system time, pid is the process identifier for the SMTP receiver 41, and hostname is the name of the host upon which the antivirus system 21 operates.

Next, index node and storage node identifiers are generated as hashes by the checksum module 44, using the unique filename as an input parameter. In the described embodiment, the index node identifier Idx is calculated in accordance with Equation (1), as follows:

$$Idx = \text{Chksum}_{idx}(fn) \% N_{idx} \qquad (1)$$

where $\text{Chksum}_{idx}$ is a checksum function for the index level of the message store 23, fn is the unique filename and $N_{idx}$ is the number of nodes in the index level. The storage node identifier Node is calculated in accordance with Equation (2), as follows:

$$Node = \text{Chksum}_{node}(fn) \% N_{node} \qquad (2)$$

where $\text{Chksum}_{node}$ is a checksum function for the storage level of the message store 23, fn is the unique filename and $N_{node}$ is the number of nodes in the storage level. Note checksum function $\text{Chksum}_{idx}$ and checksum function $\text{Chsum}_{node}$ are the same checksum function, but each using different seed values.

The message store 30 includes a directory 46, which stores the actual hierarchical structuring of the message store 45, and the actual screened messages 47. The unique filename and index node and storage node identifiers are stored in a unique filename table 48. Each screened message 47 is stored into the message store 45 by a storage module (not shown) by creating index node and storage node entries in the directory 46.

Each module, including SMTP receiver 41 and antivirus scanner 42, is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The modules operates in accordance with a sequence of process steps, as further described below with reference to FIG. 5.

Figure 4:
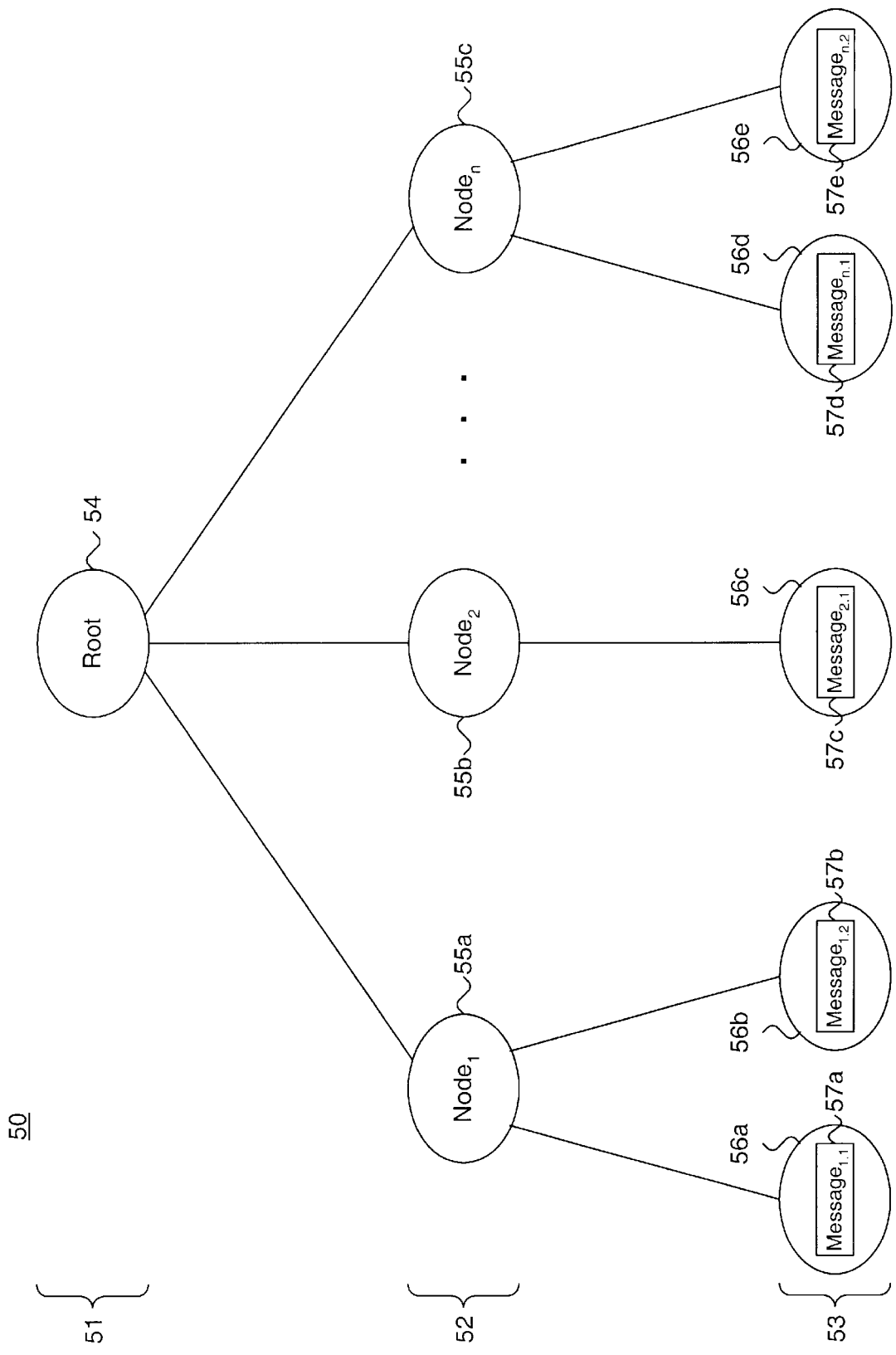
FIG. 4 is a tree diagram showing a hierarchical message store for staging transient message packets for use by the system of FIG. 3.

FIG. 4 is a tree diagram showing a hierarchical message store 50 for staging transient message packets for use by the system of FIG. 3. The message store 50 is multi-tiered and stores transient messages 57a–e in three layers: root layer 51, index layer 52 and storage layer 53. The root layer 51 includes a single root node 54, which anchors the message store 50. The index layer 52 includes a multiplicity of dependent index nodes 55a–c, each including a multiplicity of dependent storage nodes 56a–e and storing a message 57a–e. In the described embodiment, the number of index nodes 55a–c and 56a–e are prime numbers. The maximum number of index nodes 55a–c need not equal the maximum number of storage nodes 56a–e; however, the maximum number of storage nodes 56a–e associated with each index node 55a–c must be the same.

Operationally, messages 57a–e are maintained in the message store 50 using a hashed hierarchical indexing scheme. To store a message 57a–e, a unique filename is generated for the message 57a–e and index node and storage node identifiers are calculated. The index node 55a–c and storage node 56a–e corresponding to the index node and storage node identifiers are used to locate and store the message 57a–e. To access a message 57a–e, the index node and storage node identifiers for the message 57a–e are obtained from the unique filename table 48 (shown in FIG. 3). The contents of the storage node 56a–e storing the message 57a–e are retrieved by performing a lookup of the index node 55a–c and storage node 56a–e using the index node and storage node identifiers.

Since the referencing of the index nodes 55a–c and storage nodes 56a–e is performed indirectly, for instance, by using Equations (1) and (2), the structure of the message store 50 can be changed dynamically. Increasing the capacity of the message store 50 only requires increasing either or both of the maximum number of index nodes 55a–c and storage nodes 56a–e. Subsequently stored messages 57a–e will thereafter access the new index nodes 55a–c and storage nodes 56a–e.

Figure 5:
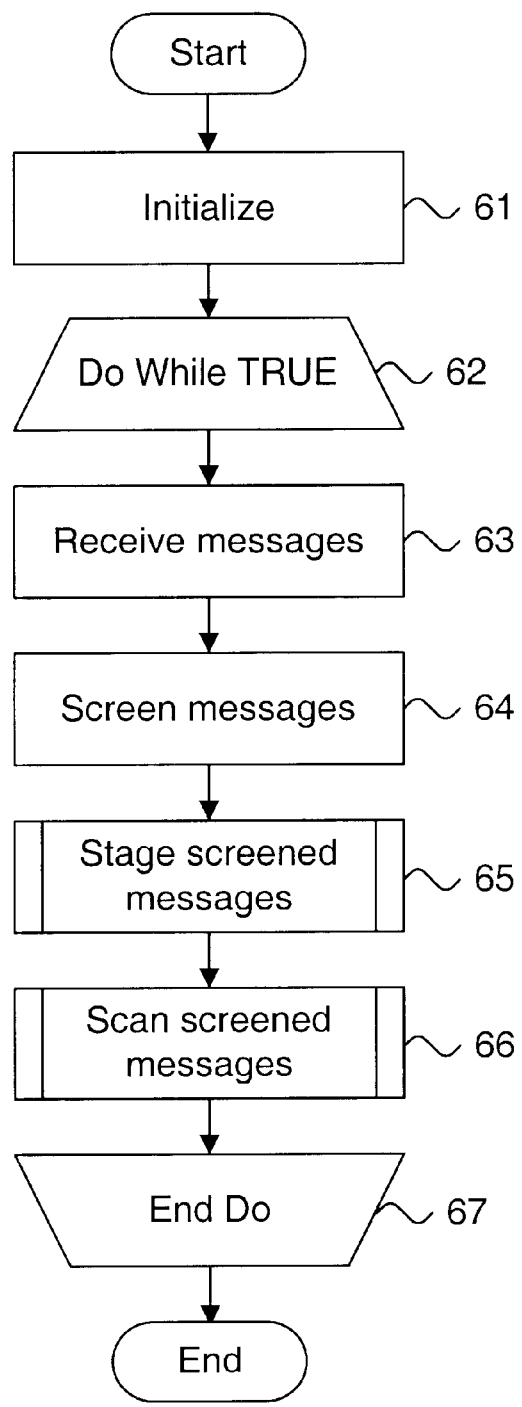
FIG. 5 is a flow diagram showing a method for providing a multi-tiered hierarchical transient message store accessed using multiply hashed unique filenames, in accordance with the present invention.

FIG. 5 is a flow diagram showing a method 60 for storing transient message packets in a hierarchical message store 45 (shown in FIG. 3) for use in a distributed computing environment 10, in accordance with the present invention. Briefly, during message receipt, screened messages 57a–e are staged in the message store 45 using hashed identifiers. Similarly, during message scanning, the screened messages 57a–e are retrieved from the message store 45 using the hashed identifiers.

First, the SMTP receiver 41 is initialized (block 61) to initialize the hierarchical structuring of the message store 45 into the directory 46. Incoming transient messages are iteratively received and processed (blocks 62–67), as follows. During each iteration (block 62), an incoming message 57a–e is received (block 63) at a network domain boundary. Each header field of the message 57a–e is screened (block 64) to block suspect messages for indications that the accompanying contents of the message contain a virus, malware or other form of bad content. Each screened message is staged in the message store 45 (block 65) and scanned by the antivirus scanner 42 (block 66), as further described below with reference to FIGS. 6 and 7, respectively. Processing continues for each incoming message 41 (block 67), until the method ends or is terminated.

Figure 6:
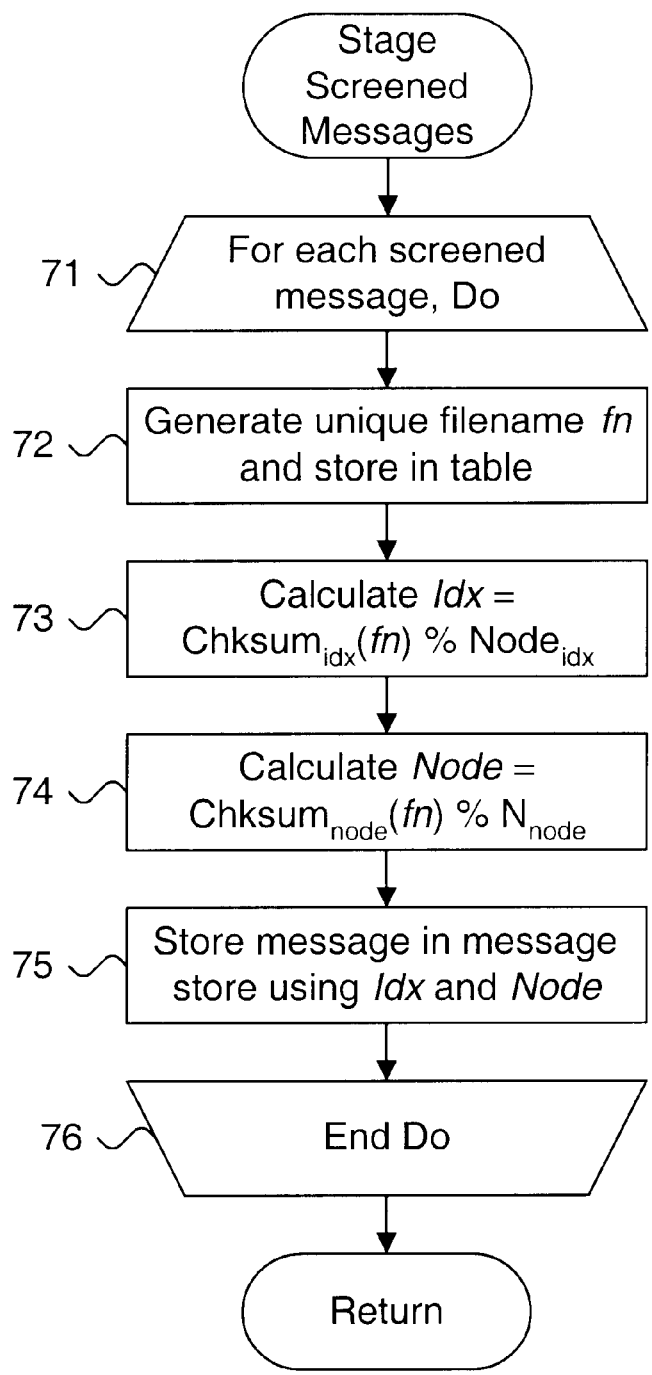
FIG. 6 is a flow diagram showing the routine for staging screened messages for use in the method of FIG. 5.

FIG. 6 is a flow diagram showing the routine 70 for staging screened messages 47 (shown in FIG. 3) for use in the method of FIG. 5. The purpose of this routine is to create hashed identifiers for and physically store each screened message in the message store 45.

Each screened message 47 is iteratively processed (blocks 71–76), as follows. During each iteration (block 71), a unique filename fn is generated for the message 47 and stored in the unique filename table 48 (block 72) in association with the message 47. Next, an index node identifier Idx and a storage node identifier Node are calculated (blocks 73 and 74, respectively), in accordance with Equations (1) and (2), above. Finally, the message is stored in the message store 45 (block 75) by creating index node and storage node entries in the directory 46. Processing continues for each screened message 47 (block 76), after which the routine returns.

Figure 7:
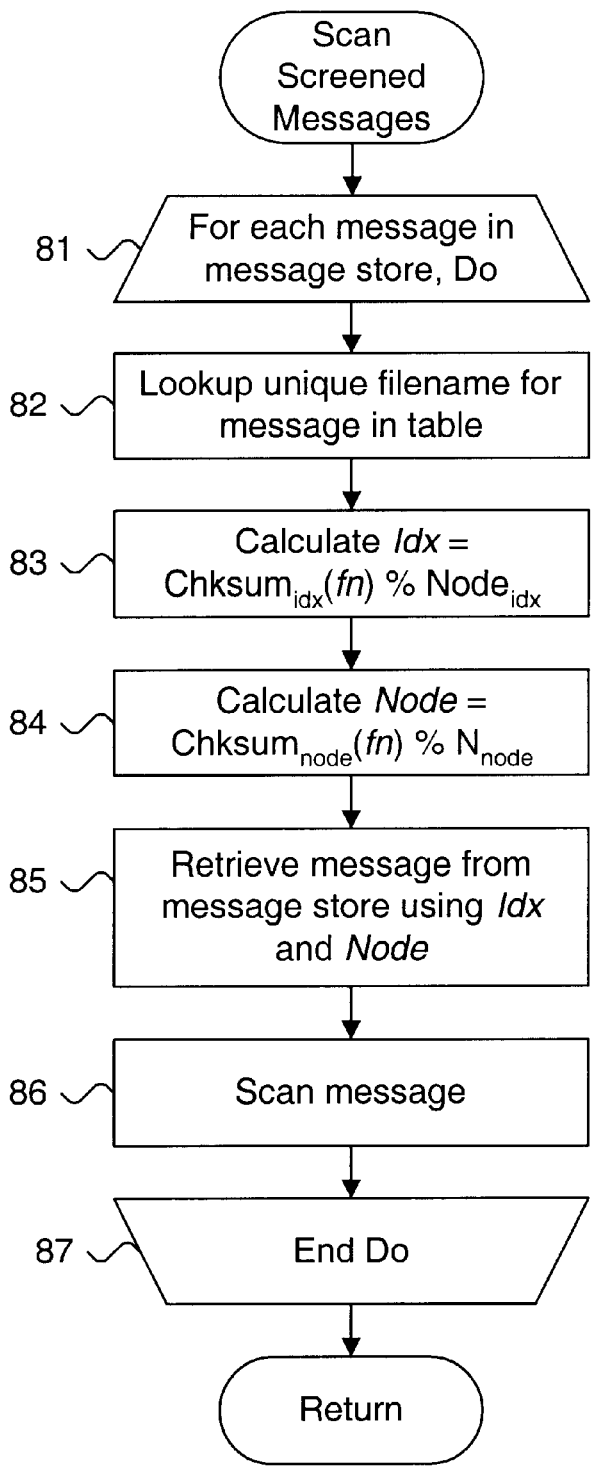
FIG. 7 is a flow diagram showing the routine for scanning screened messages for use in the method of FIG. 5.

FIG. 7 is a flow diagram showing the routine for scanning screened messages 47 (shown in FIG. 3) for use in the method of FIG. 5. The purpose of this routine is to retrieve messages 47 from the message store 45 using the hashed identifiers for scanning.

Each screened message 47 staged in the message store 45 is iteratively processed (blocks 81–87), as follows. During each iteration (block 81), the unique filename fn for the message 47 is obtained from the unique filename table 47 (block 82). Next, the index node identifier Idx and the storage node identifier Node are calculated (blocks 83 and 84, respectively), in accordance with Equations (1) and (2), above. The message is retrieved from the message store 45 (block 85) by accessing the index node and storage node entries in the directory 46. Finally, the screened message 47 (block 86) is forwarded to the antivirus scanner 42 for scanning. Processing continues for each screened message 47 (block 87), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for storing transient message packets in a hierarchical message store for use in a distributed computing environment, comprising:
a unique filename module generating a unique filename identifying an incoming message packet intercepted entering a bounded network domain;
a checksum module calculating an index checksum from the unique filename using a seed value associated with an index level in a hierarchical message store and calculating a storage checksum from the unique filename using a seed value associated with a storage level in the hierarchical message store; and
a message receiver storing the incoming message packet in an index node in the index level and a storage node in the storage level and dependent on the index node, each respectively indexed by the index checksum and the storage checksum, wherein the index checksum is calculated according to the equation:

$$Idx = Chksum_{idx}(fn) \% N_{idx}$$

where $Chksum_{idx}$ is a checksum function for the index level, fn is the unique filename and $N_{idx}$ is a number of nodes in the index level.

2. A system according to claim 1, further comprising:
a table mapping each unique filename to the index checksum and the storage checksum respectively calculated therefrom.

3. A system according to claim 2, further comprising:
a retrieval module obtaining the index checksum and the storage checksum for the incoming message packet from the table, and retrieving the incoming message packet from the hierarchical message store using the index checksum and the storage checksum to respectively locate the index node and the storage node.

4. A system according to claim 1, wherein the storage checksum is calculated according to the equation:

$$Node = Chksum_{node}(fn) \% N_{node}$$

where $Chksum_{node}$ is a checksum function for the storage level, fn is the unique filename and Nnode is a number of nodes in the storage level.

5. A system according to claim 1, wherein a number of at least one of the index nodes in the index level and the storage nodes in the storage level is set to a prime number.

6. A system according to claim 1, wherein the unique filename comprises at least one of a time stamp, process identifier, and hostname.

7. A system according to claim 1, wherein the distributed computing environment is TCP/IP-compliant and each such message packet is SMTP-compliant.

8. A method for storing transient message packets in a hierarchical message store for use in a distributed computing environment, comprising:
generating a unique filename identifying an incoming message packet intercepted entering a bounded network domain;
calculating an index checksum from the unique filename using a seed value associated with an index level in a hierarchical message store;

calculating a storage checksum from the unique filename using a seed value associated with a storage level in the hierarchical message store;

storing the incoming message packet in an index node in the index level and a storage node in the storage level and dependent on the index node, each respectively indexed by the index checksum and the storage checksum; and calculating the index checksum according to the equation:

$$Idx = Chksum_{idx}(fn) \% N_{idx}$$

where $Chksum_{idx}$ is a checksum function for the index level, fn is the unique filename and $N_{idx}$ is a number of nodes in the index level.

9. A method according to claim 8, further comprising:

obtaining the index checksum and the storage checksum for the incoming message packet from the table; and retrieving the incoming message packet from the hierarchical message store using the index checksum and the storage checksum to respectively locate the index node and the storage node.

10. A method according to claim 1, further comprising:

maintaining a table mapping each unique filename to the index checksum and the storage checksum respectively calculated therefrom.

11. A method according to claim 10, further comprising:

calculating the storage checksum according to the equation:

$$Node = Chksum_{node}(fn) \% N_{node}$$

where $Chksum_{node}$ is a checksum function for the storage level, fn is the unique filename and $N_{node}$ is a number of nodes in the storage level.

12. A method according to claim 10, further comprising:

setting a number of at least one of the index nodes in the index level and the storage nodes in the storage level to a prime number.

13. A method according to claim 10, further comprising:

creating the unique filename comprising at least one of a time stamp, process identifier, and hostname.

14. A method according to claim 10, wherein the distributed computing environment is TCP/IP-compliant and each such message packet is SMTP-compliant.

15. A computer-readable storage medium holding code for performing the method according to claim 8, 9, 10, 11, 12, 13, or 14.

* * * * *